(12) United States Patent
Sugimoto

(10) Patent No.: US 9,880,348 B2
(45) Date of Patent: Jan. 30, 2018

(54) DISPLAY APPARATUS

(71) Applicant: Sakai Display Products Corporation, Sakai-shi, Osaka (JP)

(72) Inventor: Arimasa Sugimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 292 days.

(21) Appl. No.: 14/442,524

(22) PCT Filed: Oct. 29, 2013

(86) PCT No.: PCT/JP2013/079219
§ 371 (c)(1),
(2) Date: May 13, 2015

(87) PCT Pub. No.: WO2015/063852
PCT Pub. Date: May 7, 2015

(65) Prior Publication Data
US 2016/0291240 A1    Oct. 6, 2016

(51) Int. Cl.
*F21V 8/00* (2006.01)
*G02F 1/1335* (2006.01)
(Continued)

(52) U.S. Cl.
CPC ......... *G02B 6/0088* (2013.01); *G02B 6/0055* (2013.01); *G02B 6/0056* (2013.01);
(Continued)

(58) Field of Classification Search
CPC ......... G02F 1/133606; G02F 1/133528; G02F 1/133308; G02B 6/0055; G02B 6/0056; G02B 6/0088
See application file for complete search history.

(56) References Cited

U.S. PATENT DOCUMENTS 8,310,617 B2 * 11/2012 Shimizu ............ G02F 1/133308
349/58
9,279,934 B2 * 3/2016 Jang .................... G02B 6/0088
(Continued)

FOREIGN PATENT DOCUMENTS

CN         1361446 A      7/2002
CN       102352986 A      2/2012
(Continued)

*Primary Examiner* — Anabel Ton
(74) *Attorney, Agent, or Firm* — Rudy J. Ng; Bret E. Field; Bozicevic, Field & Francis LLP

(57) ABSTRACT

Provided is a display apparatus in which a deflection of an optical sheet as well as a slit due to vibration and impact are suppressed while a flaw in a member being in contact with the optical sheet is suppressed, uniform surface luminance and preferable image quality are attained, and thus the occurrence of a defect is suppressed.

A display module in a TV receiver includes a display panel, an optical sheet group, a light guide plate, a chassis, a panel holding member and a bezel. At the middle part of the lower side portion of the optical sheet group, a latch hole is formed. At a portion of the bottom part of the chassis, which is opposed to the latch hole, is provided with a projecting part formed to have a cylindrical main body and a latch projection continuously formed from the main body with a cylindrical shape having a diameter smaller than that of the main body. The optical sheet group is supported at its lower side portion by a side part on the lower side of the chassis in the state where the latch projection is inserted into the latch hole to position the optical sheet group.

15 Claims, 15 Drawing Sheets

(51) Int. Cl.
    *G02F 1/1333*   (2006.01)
    *H04N 5/50*     (2006.01)
    *H04N 5/64*     (2006.01)
(52) U.S. Cl.
    CPC .. *G02F 1/133308* (2013.01); *G02F 1/133528* (2013.01); *G02F 1/133606* (2013.01); *G02F 1/133608* (2013.01); *H04N 5/50* (2013.01); *G02F 2001/133302* (2013.01); *G02F 2001/133317* (2013.01); *G02F 2201/54* (2013.01); *H04N 5/64* (2013.01)

(56) References Cited

U.S. PATENT DOCUMENTS

| | | | |
|---|---|---|---|
| 2002/0080298 A1 | 6/2002 | Fukayama | |
| 2005/0099604 A1 | 5/2005 | Mizukami et al. | |
| 2012/0044439 A1* | 2/2012 | Takata | G02F 1/133604 349/61 |
| 2012/0092890 A1* | 4/2012 | Matsui | G02B 6/0091 362/607 |
| 2012/0281153 A1 | 11/2012 | Kuromizu | |
| 2013/0141651 A1* | 6/2013 | Kuromizu | G02B 6/0088 348/739 |
| 2013/0242224 A1* | 9/2013 | Yu | G02B 6/0085 349/58 |
| 2015/0277179 A1* | 10/2015 | Nishi | G02B 6/0088 349/58 |
| 2016/0116787 A1* | 4/2016 | Kim | G02F 1/133308 349/58 |

FOREIGN PATENT DOCUMENTS

| | | |
|---|---|---|
| CN | 202835065 U | 3/2013 |
| JP | 2005158707 A | 6/2005 |
| JP | 2007024913 A | 2/2007 |
| WO | WO2010004822 A1 | 1/2010 |
| WO | WO2011093119 A1 | 8/2011 |

\* cited by examiner

F I G. 5
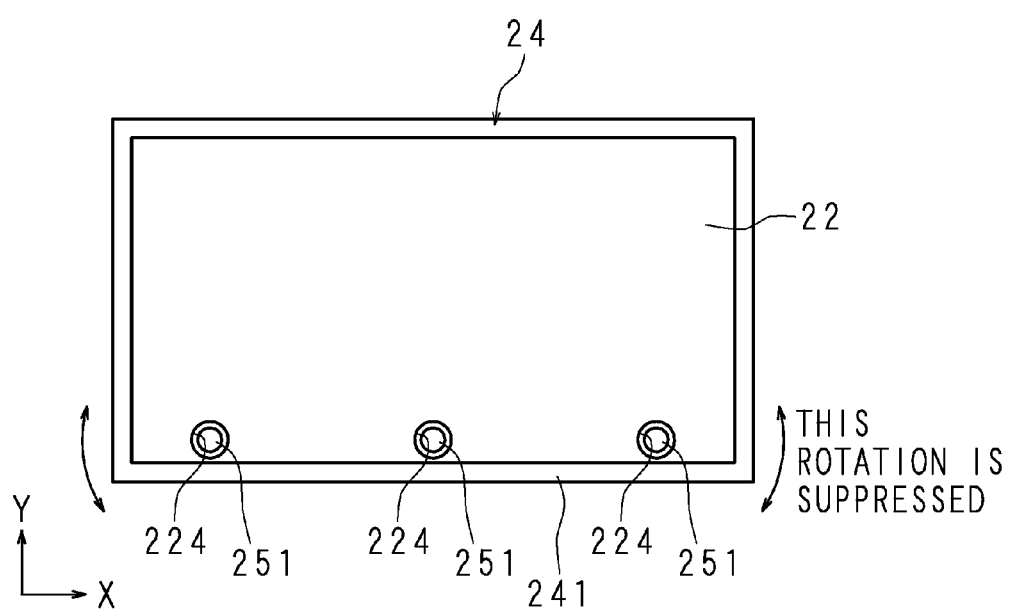

F I G. 7
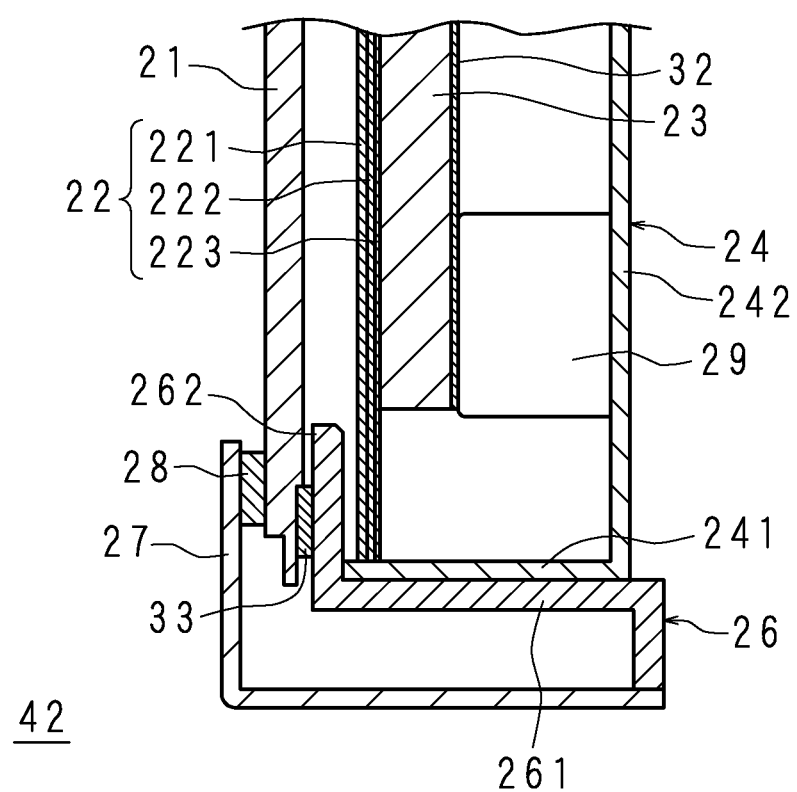

DISPLAY APPARATUS

CROSS-REFERENCE TO RELATED APPLICATIONS

This application is the national phase under 35 U.S.C. § 371 of PCT International Application No. PCT/JP2013/079219 which has an International filing date of Oct. 29, 2013 and designated the United States of America.

BACKGROUND

1. Technical Field

The present invention relates to a display apparatus including a light source, a light guide plate or diffusion plate, an optical sheet and a display panel.

2. Description of Related Art

A thin television receiver such as a liquid-crystal television receiver (hereinafter referred to as TV receiver) generally has a display module (display apparatus: liquid-crystal display module in the case of a liquid-crystal TV receiver), and a substrate for driving the display module. The display module is accommodated vertically in a front cabinet and a rear cabinet that are vertically arranged at the front and back sides. In the case of being a liquid-crystal display module of an edge light type, the display module includes, for example, a display panel and a backlight unit having, an optical sheet, a light guide plate, a reflection sheet and a chassis. A light source such as an LED substrate in the backlight unit is disposed at a side plate of the chassis. In the displaying operation, planar light is emitted from the light guide plate, and the back surface of the display panel is illuminated with the light.

The display panel has a liquid-crystal layer, a pair of glass substrates (a color filter substrate, a TFT substrate) and polarization plates. The pair of glass substrates are bonded to each other through a seal material, and hold the liquid-crystal layer between them. Each polarization plate is placed on a surface at the opposite side from the liquid-crystal layer side of each of the pair of glass substrates.

The optical sheet is configured to perform light control such as light reflection, polarization, refraction and diffusion in order to improve the quality of an image, i.e. to increase the luminance, to make the surface luminance uniform and the like, on a screen of the display panel.

In the case where the optical sheet is not positioned by the display module, it may flap and make contact with the polarization plate or the like, possibly causing a flaw.

Moreover, in the case where the optical sheet is positioned by hanging it at the middle of its upper side, the load is concentrated at the hanging portion of the sheet. Since the sheet's own weight has become heavier along with the increased size of the display module, the sheet may easily deflect, which causes such a problem that a slit is generated at the hanging portion due to vibration or impact. Also when the optical sheet is so configured that: a protrusion of an angled plate-like shape protruding upward is formed at the upper side part of the optical sheet; a latch hole is formed at the protrusion; a projection is further formed at a part of the light guide plate opposed to the latch hole: and the optical sheet hangs while the projection is inserted into the latch hole, the protrusion may be torn.

An example of a display apparatus so configured that the middle part of the upper side of the optical sheet is used to hang the optical sheet as described above is disclosed in Japanese Patent Application Laid-Open Publication No. 2007-24913, which prevents the image quality from degrading by a part of components of optical sheets, which is separated due to mutual friction between the optical sheets caused by vibration or impact during transportation of the display apparatus and which generates fine powder-like dust remaining in a light path or moving to an unspecified portion of the light path.

FIG. 15 is a partial vertical section view illustrating a display apparatus according to Japanese Patent Application Laid-Open Publication No. 2007-24913.

The display apparatus comprises a display panel 21, an optical sheet group 22 including, for example, three optical sheets, a chassis 24, a panel holding member 26, a bezel 27, a reflection member (diffusion plate) 36 and a front cabinet 37.

The chassis 24 has a substantially box-like shape with the display panel 21 side being open, and has an opening edge protruding outward. Moreover, at the middle part in the lateral direction of the display panel 21 on the upper side part of the chassis 24, a projecting part 245 protruding toward the display panel 21 side is formed.

The reflection member 36 also has a substantially box-like shape and is so formed that the bottom part thereof is in contact with the bottom part of the chassis 24 and the side part thereof is formed to rise obliquely upward, and that the opening edge protruding outward is in contact with the opening edge of the chassis 24 through a buffer member 246.

At the middle part in the lateral direction of the upper side of the optical sheet group 22, a latch hole 228 is formed.

While the projecting part 245 is inserted into the latch hole 228, the optical sheet group 22, reflection member 36 and buffer member 246 are held between a frame-shaped panel holding member 26 and the opening edge of the chassis 24.

An upper edge of the display panel 21 is held between a frame-shaped bezel 27 and the panel holding member 26.

According to the configuration described above, the display panel 21, optical sheet group 22, reflection member 36 and chassis 24 are integrated and the bezel 27 is further covered by a front cabinet 27.

In the display apparatus described above, the buffer member 246 presses the back surface of the optical sheet group 22 through the reflection member 36, which does not restrict the positional shift of the optical sheet group 22 caused by slow expansion and contraction thereof due to changes in temperature or humidity in the environment of usage, while restricting the movement of each optical sheet in the optical sheet group 22 by the mutual friction resistance between optical sheets in the optical sheet group 22 for abrupt and frequent movements such as vibration or impact during transportation of the display apparatus. Therefore, degrading of image quality can be prevented, which may be caused by fine powder-like dust generated due to mutual friction between optical sheets and remaining in the light path or moving to an unspecified portion in the light path.

SUMMARY

In the case of the display apparatus in Japanese Patent Application Laid-Open Publication No. 2007-24913, deflection may occur in the optical sheet group 22 by pressing it with the buffer member 246. Moreover, as in the conventional other display apparatus described above, the optical sheet group 22 may also deflect due to concentration of stress at a hanging part.

Another problem arises in that the thickness of the display apparatus is increased because it is necessary to secure a space for the arrangement of the buffer member 246 in the thickness direction of the display module.

Furthermore, such a configuration has also been a cause for increase in cost.

The present invention has been made in view of the circumstances describe above, and aims to provide a display apparatus in which deflection of optical sheets as well as the occurrence of a slit or the like due to vibration and impact are suppressed while the occurrence of a flaw is suppressed in a member being in contact with the optical sheets, uniform surface luminance and preferable image quality are attained, and the occurrence of a defect is also suppressed.

A display apparatus according to the present invention, including: a chassis in which a light source and a light guide plate or a diffusion plate are accommodated; an optical sheet disposed in parallel with a bottom part of the chassis; a display panel disposed outside the optical sheet; and a panel holding member holding the display panel while sandwiching the optical sheet between the panel holding member and the light guide plate or diffusion plate, is characterized by further including: a latch hole formed at a lower side portion of the optical sheet; and a projecting part formed at a portion of a bottom part of the chassis, the portion being opposed to the latch hole, and latched by being inserted into the latch hole, and is characterized in that the lower side portion of the optical sheet is supported by a side part on a lower side of the chassis.

Here, the chassis is not limited to the one provided with side plates along the entire circumference of a bottom plate, but may be, for example, the one provided with side plates at opposing two sides of the bottom plate formed in a rectangular shape. Moreover, the chassis is not limited to be formed as one integral object from the beginning but may have a shape of a tray or case integrated by connecting an angle to the bottom plate of the chassis body.

According to the present invention, since the lower part (lower side) of the optical sheet is supported by the side part of the chassis in the state where the projecting part is inserted into the latch hole to position the optical sheet in the X direction, the occurrence of a deflection and slit is suppressed while the occurrence of a flaw in the light guide plate or diffusion plate as well as the polarization plate or the like caused by the optical sheet moving in the front-back directions is also suppressed, unlike the case where the optical sheet hangs at the upper part thereof.

Therefore, the display apparatus has uniform surface luminance and preferable image quality while the occurrence of a defect is suppressed.

The thickness of the display apparatus is not increased unlike the display apparatus in Japanese Patent Application Laid-Open Publication No. 2007-24913.

A display apparatus according to the present invention, including: a chassis in which a light source and a light guide plate or diffusion plate are accommodated; an optical sheet disposed in parallel with a bottom part of the chassis; a display panel disposed outside the optical sheet; and a frame-like panel holding member holding the display panel while sandwiching the optical sheet between the panel holding member and the display panel, is characterized by further including: a latch hole formed at a lower side portion of the optical sheet; a projecting part formed at a portion of the panel holding member, the portion being opposed to the latch hole, and latched by being inserted into the latch hole; and a sheet support provided to protrude outward at a portion of the panel holding member, the portion being opposed to the optical sheet, for supporting a lower side of the optical sheet.

According to the present invention, the lower part of the optical sheet is supported by the sheet support in the state where the projecting part is inserted into the latch hole to position the optical sheet in the X direction, the occurrence of a deflection and slit is suppressed while the occurrence of a flaw in the light guide plate or diffusion plate as well as the polarization plate or the like caused by the optical sheet moving in the front-back directions is also suppressed.

Moreover, the support structure for the optical sheet according to the present invention is compact and has a higher degree of freedom in design compared to the case where a projecting part is formed at the bottom part of the chassis, which thus can more preferably narrow the frame.

Furthermore, the thickness of the display apparatus is not so increased, unlike the display apparatus in Japanese Patent Application Laid-Open Publication No. 2007-24913.

A display apparatus according to the present invention, including: a chassis in which a light guide plate is accommodated; an optical sheet disposed in parallel with a bottom part of the chassis; a substrate having a light emitting element and disposed on a side surface of the light guide plate; a display panel disposed outside the optical sheet; and a panel holding member holding the display panel while sandwiching the optical sheet between the panel holding member and the light guide plate, is characterized by further including: a latch hole formed at a lower side portion of the optical sheet; and a projecting part formed at a portion of the light guide plate or the chassis, the portion being opposed to the latch hole, and latched by being inserted into the latch hole, and is characterized in that the lower side portion of the optical sheet is supported by the substrate.

According to the present invention, the lower part of the optical sheet is supported by the substrate in the state where the projecting part is inserted into the latch hole to position the optical sheet in the X direction, so that the occurrence of a deflection and slit is suppressed while the occurrence of a flaw in the light guide plate or diffusion plate as well as the polarization plate or the like caused by the optical sheet moving in the front-back directions is also suppressed.

Moreover, the optical sheet according to the present invention has a compact support structure.

The display apparatus according to the present invention is characterized in that a protrusion protruding downward from the lower side portion is formed at the optical sheet, and the latch hole is formed at the protrusion.

According to the present invention, the movement of the optical sheet in the X direction is further suppressed.

The display apparatus according to the present invention is characterized by including a multiple number of the latch holes and the projecting parts.

According to the present invention, rotation (swing in the θ direction) is suppressed.

The display apparatus according to the present invention is characterized in that a regulation part for regulating movement in a horizontal direction of the optical sheet is provided at an upper part of the optical sheet.

According to the present invention, the movement in the X direction is further suppressed.

The display apparatus according to the present invention is characterized in that the optical sheet includes a reflective polarization sheet.

According to the present invention, in the case where the optical sheet includes a reflective polarization sheet which is easily deflected and is easily torn due to its lamination structure, the occurrence of a deflection and slit can preferably be suppressed.

According to the display apparatus of the present invention, the occurrence of a deflection as well as a slit or the like due to vibration and impact in the optical sheets is suppressed while the occurrence of a flaw in the member being in contact with the optical sheet is suppressed, which allows the surface luminance to be uniform and the image quality to be preferable, while suppressing the occurrence of a defect. Moreover, the thickness of the display apparatus is not increased.

The above and further objects and features will more fully be apparent from the following detailed description with accompanying drawings.

BRIEF DESCRIPTION OF THE SEVERAL VIEWS OF THE DRAWINGS

FIG. 5 is a schematic front view illustrating an optical sheet group and a chassis according to a modification;

FIG. 7 is a partial vertical section view of a display module in a portion of the optical sheet group where no protrusion is formed;

DETAILED DESCRIPTION

The present invention will be described below with reference to the drawings illustrating embodiments thereof.

Embodiment 1

Figure 1:
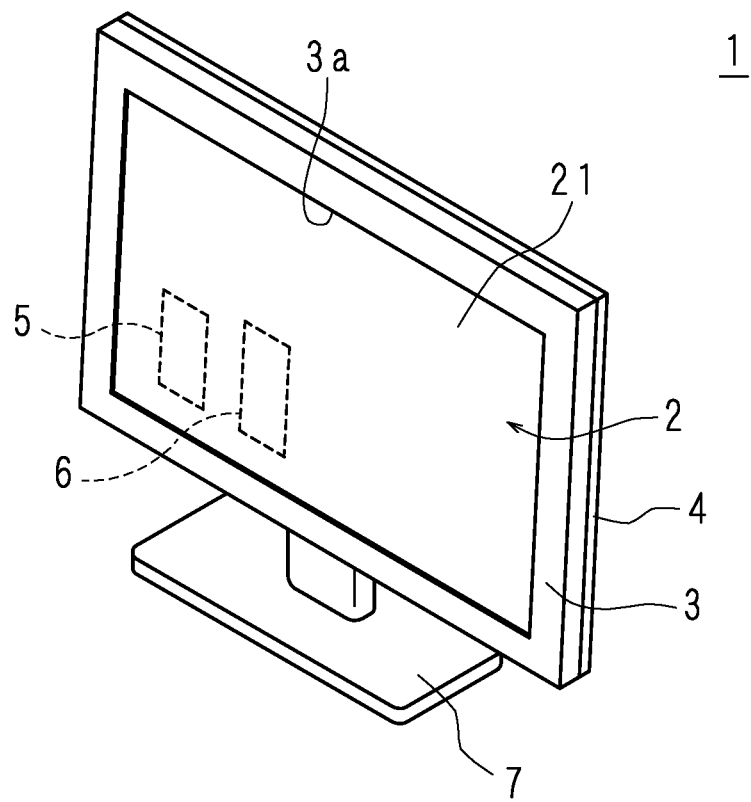
FIG. 1 is a perspective view of the outer appearance of the front side of a TV receiver according to Embodiment 1 of the present invention.
Figure 2:
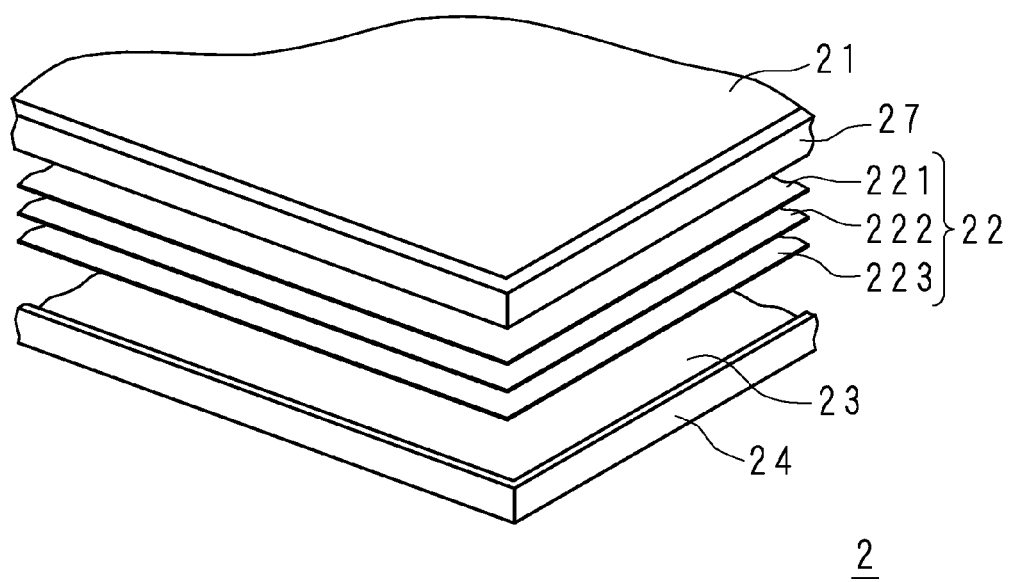
FIG. 2 is a schematic perspective view illustrating a display module according to Embodiment 1 of the present invention.
Figure 3:
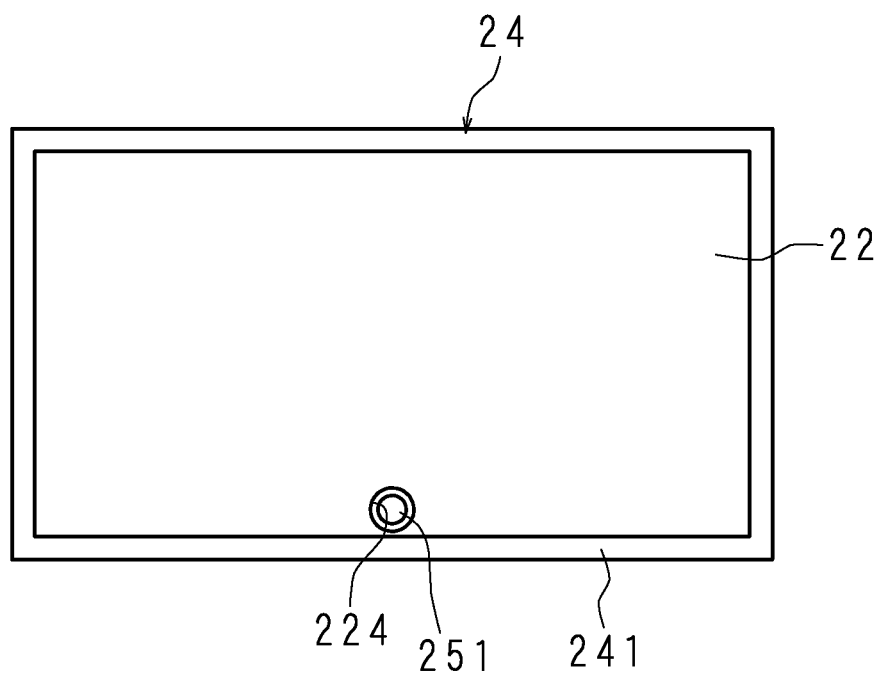
FIG. 3 is a schematic front view illustrating an optical sheet group and a chassis according to Embodiment 1 of the present invention.
Figure 4:
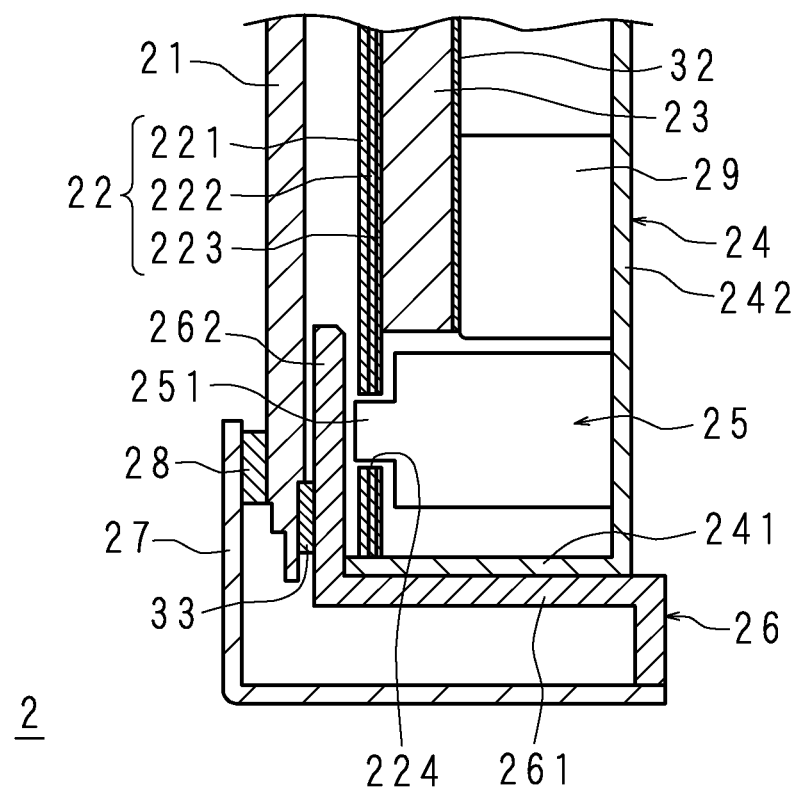
FIG. 4 is a partial vertical section view illustrating a display module according to Embodiment 1 of the present invention.

FIG. 1 is a perspective view of the outer appearance of the front side of a TV receiver 1 according to Embodiment 1 of the present invention; FIG. 2 is a schematic perspective view illustrating a display module 2; FIG. 3 is a schematic front view illustrating an optical sheet group 22 and a chassis 24; and FIG. 4 is a partial vertical section view illustrating a display module 2.

The TV receiver 1 includes a horizontally-long display module 2 on which a video image is displayed, a tuner 5 receiving broadcast wave from an antenna (not illustrated), and a decoder 6 for decoding encoded broadcast wave. In the TV receiver 1, the decoder 6 decodes broadcast wave received by the tuner 5, and a video image is displayed on the display module 2 based on decoded information. At the lower part of the TV receiver 1, a stand 7 for supporting the TV receiver 1 is provided.

The display module 2 is accommodated, with a vertical posture, in a front cabinet 3 and a rear cabinet 4 vertically arranged at the front and back sides thereof. The front cabinet 3 is a rectangular frame body covering the peripheral part of the display module 2, and has a rectangular opening 3a in the middle. The front cabinet 3 is made of, for example, a plastic material. The rear cabinet 4 has the shape of a rectangular tray with its front side being open, and is made of, for example, a plastic material. It is to be noted that the front cabinet 3 and rear cabinet 4 may also be configured of other materials.

The upper and lower dimensions as well as left and right dimensions of the front cabinet 3 and rear cabinet 4 are approximately the same, and the peripheral parts thereof are opposed to each other. The dimensions of the upper, lower, left and right sides of the display panel 21 are slightly larger than those of the opening 3a of the front cabinet 3, while the peripheral part of the display panel 21 is opposed to the inner edge of the front cabinet 3.

As illustrated in FIGS. 2 and 4, the display module 2 includes a display panel 21, an optical sheet group 22 comprised of, for example, three optical sheets 221, 222 and 223, a light guide plate 23, a chassis 24, a protrusion 25, a panel holding member 26, a bezel 27 and a reflection sheet 32.

The optical sheet group 22, light guide plate 23, chassis 24 and reflection sheet 32 constitute a backlight unit.

The display panel 21 includes a liquid-crystal layer, a pair of glass substrates and polarization plates. The pair of glass substrates are bonded to each other through a seal material, while the liquid-crystal layer is held between them. Each polarization plate is placed on each of the surfaces of the pair of glass substrates on the opposite side from the liquid-crystal layer side.

The chassis 24 has a substantially box-like shape with the display panel 21 side being open, and includes a side part 241 and a bottom part 242. The optical sheet group 22, light guide plate 23 and an LED (Light Emitting Diode) substrate (not illustrated) are accommodated in the chassis 24. It is to be noted that the light source for the back light unit is not limited to an LED, but may also be a cold-cathode tube or the like.

On the back surface of the chassis 24, a main substrate including the tuner 5, a CPU and the like is provided (not illustrated).

The light guide plate 23 has the shape of a rectangular plate, and has a main surface opposed to the display panel 21 side, a rear surface opposed to the chassis 24 at the opposite surface of the main surface, a pair of long side surfaces and a pair of short side surfaces. One of the short side surfaces serves as a light entering surface for introducing light into the light guide plate 23, and the light introduced into the light guide plate 23 from the short side surface is emitted from the main surface (emitting surface) of the light guide plate 23 toward the display panel 21 side.

The reflection sheet 32 is a white sheet, which is formed by a resin material having a light reflecting property such as PET (polyethylene terephthalate) or PC (polycarbonate), for example. The reflection sheet 32 is provided at the bottom part 242 of the chassis 24 through a spacer 29.

The light guide plate 23 is disposed on the outer surface of the reflection sheet 32.

The optical sheet group 22 is a sheet group including a diffusion sheet, lens sheet, reflective polarization sheet and the like, and is disposed at the front side of the main surface of the light guide plate 23. By the optical sheet group 22, diffusion, condensing and the like of light emitted from the main surface of the light guide plate 23 are performed. Examples of the reflective polarization sheet include, more specifically, a sheet obtained by alternatively stacking resin having a large phase difference in birefringence (such as polycarbonate, acrylic resin and polyester resin) and resin having a small phase difference in birefringence (such as cycloolefin polymer) in multiple layers and uniaxially stretching the layered resin, and a sheet made from a structure in which birefringent polyester resin is stacked in multiple layers (DBEF, manufactured by Sumitomo 3M Limited).

As illustrated in FIG. 3, at the middle of the lower part (lower side) of the optical sheet group 22, a latch hole 224 which is a round hole is formed.

As illustrated in FIG. 4, at a portion of the bottom part 242 of the chassis 24 opposed to the latch hole 224, a projecting part 25 is provided having a cylindrical main body and a latch projection 251 formed continuously from the main body to be in a cylindrical shape with a diameter smaller than that of the main body.

The diameter of the latch projection 251 is a little smaller than the diameter of the latch hole 224.

The optical sheet group 22 is supported at its lower hem by the side part 241 on the lower side of the chassis 24 in the state where the latch protrusion 251 is inserted into the latch hole 224 to position the optical sheet group 22.

The present invention is not limited to the case where the latch hole 224 is a round hole and the latch projection 251 has a cylindrical shape, but another case where the latch hole 224 is an angled hole and the latch projection 251 has a prismatic shape may also be possible.

Moreover, the present invention is not limited to the case where a latch hole is formed at each one of all the optical sheets constituting the optical sheet group 22.

The panel holding member 26 is a frame body formed in a substantially L shape in a side view, and includes a chassis covering part 261 which covers the side part 241 and a sheet covering part 262 which covers the lower part of the optical sheet group 22.

On the outer surface of the sheet covering part 262, a display panel 21 is disposed through a buffer member 33.

The bezel 27 is a frame body formed in an L shape in a side view, and covers the peripheral parts of the panel holding member 26 and display panel 21. The back surface of the front side portion of the bezel 27 is in contact with the outer surface of the display panel 21 through a buffer member 28. In other words, the display panel 21 is held between the bezel 27 and the panel holding member 26 through the buffer members 28 and 33.

As described above, in the present embodiment, since the lower hem of the optical sheet group 22 is supported by the side part 241 of the chassis 24 in the state where the latch projection 251 is inserted into the latch hole 224 to position the optical sheet group 22 in the X direction, the occurrence of a deflection and slit in the optical sheet group 22 is suppressed while the occurrence of a flaw in the light guide plate 23 and the polarization plate or the like caused by the optical sheet moving in the front-back directions is also suppressed, unlike the case where the optical sheet group 22 hangs at the upper part thereof.

Moreover, while the optical sheet group 22 according to the present embodiment includes a reflective polarization sheet such as a DBEF sheet which is easily deflected and is also easily torn due to its layered structure, such occurrence of a deflection and slit in the reflective polarization sheet is preferably suppressed.

Because of the configuration described above, the display module 2 has uniform surface luminance and preferable image quality, which suppress the occurrence of a defect.

The structure according to the present invention does not restrict the positional shift of the optical sheet 221 and the like constituting the optical sheet group 22 caused by slow expansion and contraction thereof due to changes in temperature or humidity in the environment of usage.

A modification of the optical sheet group 22 will be described below.

FIG. 5 is a schematic front view illustrating an optical sheet group 22 and a chassis 24.

Three latch holes 224 are formed in the middle and at positions near both ends of the lower part of the optical sheet group 22, while three projecting parts 25 are formed at the lower part on the bottom part 241 of the chassis 24.

The lower hem of the optical sheet group 22 is supported by the side part 241 of the chassis 24 in the state where each latch projection 251 is inserted into each latch hole 224 to position the optical sheet group 22.

This configuration suppresses rotation of the optical sheet group 22 also in the θ direction.

Embodiment 2

A display module 42 according to Embodiment 2 of the present invention has the same configuration as that of the display module 2 according to Embodiment 1, except that a protrusion 225 is formed at the lower part of the optical sheet group 22.

Figure 6:
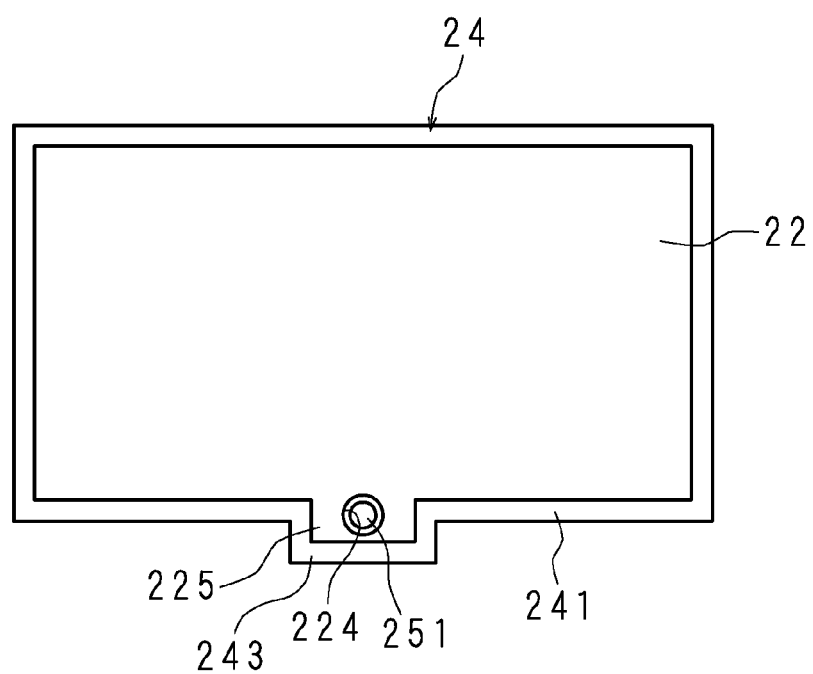
FIG. 6 is a schematic front view illustrating an optical sheet group and a chassis according to Embodiment 2 of the present invention.
Figure 8:
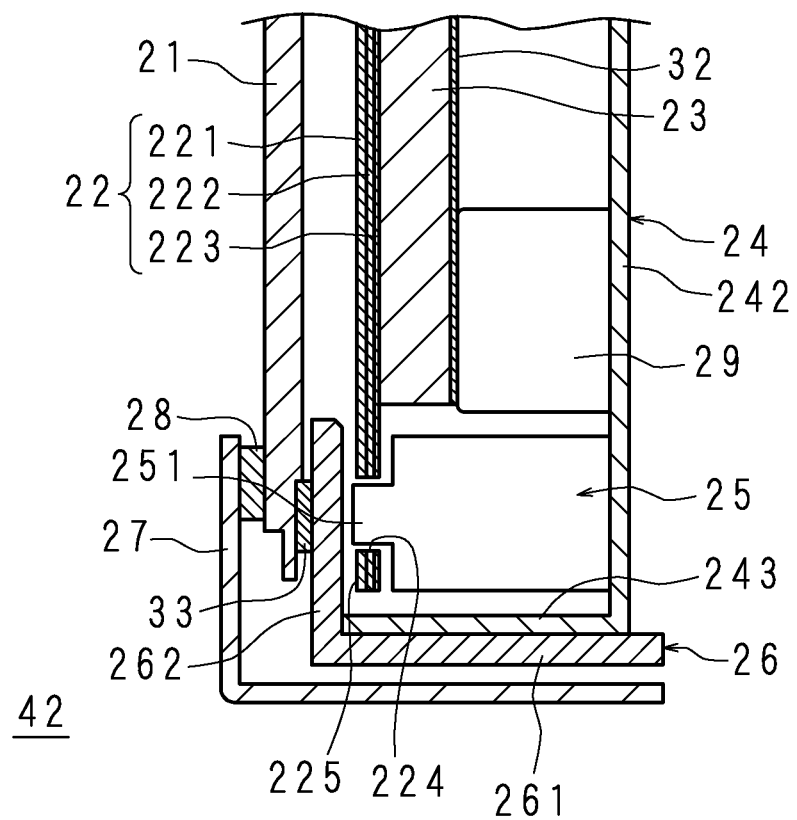
FIG. 8 is a partial vertical section view of a display module in a portion of the optical sheet group where a protrusion is formed.

FIG. 6 is a schematic front view illustrating an optical sheet group 22 and a chassis 24; FIG. 7 is a partial vertical section view of a display module 42 in a portion of the optical sheet group 22 where a protrusion 225 is not formed; and FIG. 8 is a partial vertical section view of a display module 42 in a portion of the optical sheet group 22 where the protrusion 225 is formed. In FIGS. 6 through 8, the same part as that in FIGS. 3 and 4 is denoted by the same reference code and will not be described in detail.

At the middle part of the lower side of the optical sheet group 22 in the horizontal direction, a protrusion 225 having a small angled plate-like shape is formed downward, and a latch hole 224 formed in a round hole is provided at the protrusion 225.

In the middle of the side part 241 of the chassis 24, the protrusion covering part 243 formed in a rectangular shape in a front view is provided downward, and a projecting part 25 is formed on the back surface of the protrusion covering part 243.

The chassis covering part 261 of the panel holding member 26 is formed to cover the portion of the side part 241 not provided with the protrusion covering part 243 (see FIG. 7), while covering the bottom part of the protrusion covering part 243 at the portion provided with the protrusion covering part 243 (see FIG. 8).

As illustrated in FIGS. 6 and 7, a portion not provided with the protrusion 225 on the lower side of the optical sheet group 22 is supported by the side part 241 of the chassis 24.

As illustrated in FIGS. 6 and 8, the protrusion 225 is accommodated in the protrusion covering part 243 in the state where the latch projection 251 is inserted into the latch hole 224 and the lower end of the protrusion 225 is separated from the bottom surface of the protrusion covering part 243 by a small distance.

According to the present embodiment, the protrusion 225 is fitted into the protrusion covering part 243, further preventing the optical sheet group 22 from moving in the X and Y directions.

Moreover, the latch hole 224 of the display module 42 may be formed at a position lower than the position of the latch hole 224 of the display module 2 according to Embodiment 1, so that the display region of the display panel 21 may be made wider accordingly. Therefore, the height of the portion of the bezel 27 covering the display panel 21 can be lowered, thereby narrowing the frame of the display module 42 is attained.

A modification of the optical sheet group 22 will be described below.

Figure 9:
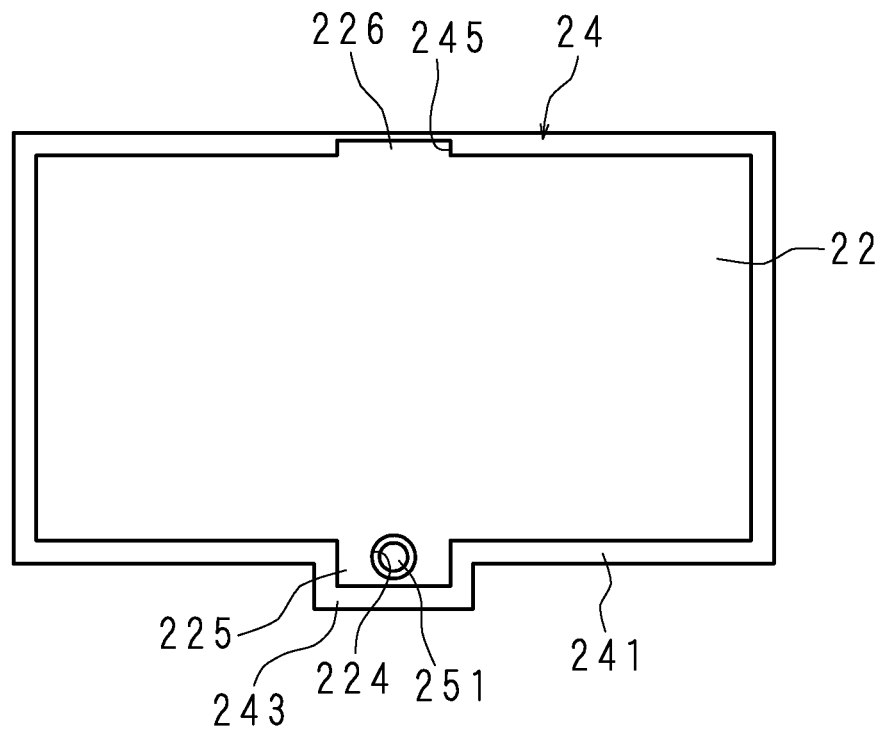
FIG. 9 is a schematic front view illustrating an optical sheet group and a chassis according to a modification.

FIG. 9 is a schematic front view illustrating an optical sheet group 22 and a chassis 24.

At the upper part of the optical sheet group 22, a protrusion 226 formed in the shape of a rectangular plate is provided to correspond to the protrusion 225. The height of the protrusion 226 is lower than the height of the protrusion 225. At the side part 241 of the upper side of the chassis 24, a cutout 245 formed in a rectangular shape is provided.

In the present modification, the protrusion 225 is accommodated in the protrusion covering part 243 in the state where the latch projection 251 is inserted into the latch hole 224, while the protrusion 226 is fitted into the cutout 245.

This also prevents the upper part of the optical sheet group 22 from moving in the X direction. Note that, in the protrusion covering part 243 and cutout 245, the protrusions 224 and 225 may move in the Y direction, so that fine adjustment of the position of the optical sheet group 22 in the Y direction is possible.

In place of the protrusion 226, a cutout or hole may be formed at the upper part of the optical sheet group 22 so as to latch the optical sheet group 22 to the side part 241 of the upper side of the chassis 24.

Embodiment 3

The display module 52 according to Embodiment 3 of the present invention has the same configuration as that of the display module 2 according to Embodiment 1, except that the LED substrate 30 is disposed on the side of the long side surface of the light guide plate 23 and the optical sheet group 22 is supported by the LED substrate 30.

Figure 10:
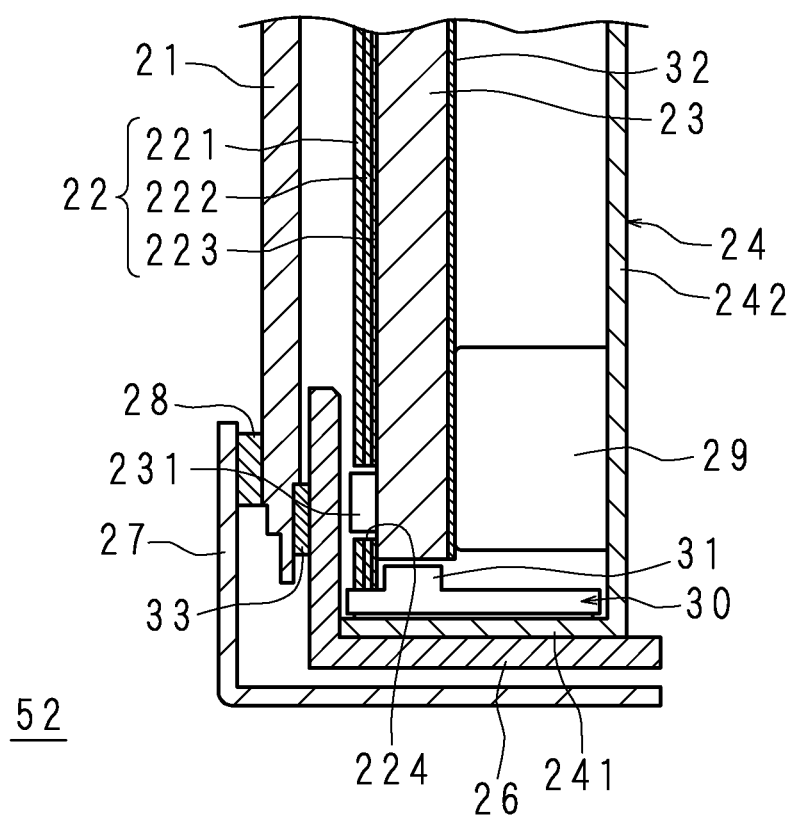
FIG. 10 is a partial vertical section view illustrating a display module according to Embodiment 3 of the present invention.

FIG. 10 is a partial vertical section view illustrating a display module 52 according to Embodiment 3 of the present invention. In FIG. 10, the same part as that in FIG. 4 will be denoted by the same reference code and will not be described in detail.

The LED substrate 30 is to generate light to be introduced into the light guide plate 23 from a long side surface thereof, and is provided at the side part 241 on the lower side of the chassis 24. The substrate of the LED substrate 30 has a long and narrow rectangular shape, and a plurality of LEDs 31 are mounted on a flat surface of the substrate. The LED substrate 30 extends along the long side of the main surface of the light guide plate 23, while being arranged so that the LEDs 31 are opposed to the long side surface of the light guide plate 23.

At the middle part in the horizontal direction of the lower part of the optical sheet group 22, a latch hole 224 which is a round hole is formed. The optical sheet group 22 does not have the protrusion 225 in the optical sheet group 22 according to Embodiment 2.

At the middle part on the lower side of the light guide plate 23, a latch projection 231 formed in a cylindrical shape is provided.

As illustrated in FIG. 10, the lower hem of the optical sheet group 22 is supported by a flat surface of the LED substrate 30 while the latch projection 231 is inserted into the latch hole 224.

In the present embodiment, the optical sheet group 22 is positioned on the LED substrate 30 with a simple structure and is supported thereby.

Embodiment 4

The display module 62 according to Embodiment 4 of the present invention has a configuration similar to that of the display module 2 according to Embodiment 3, except that the optical sheet group 22 has a protrusion 225 and a projecting part 25 having a latch projection 251 inserted into the latch hole 224 is formed at the bottom part 242 of the chassis 24.

Figure 11:
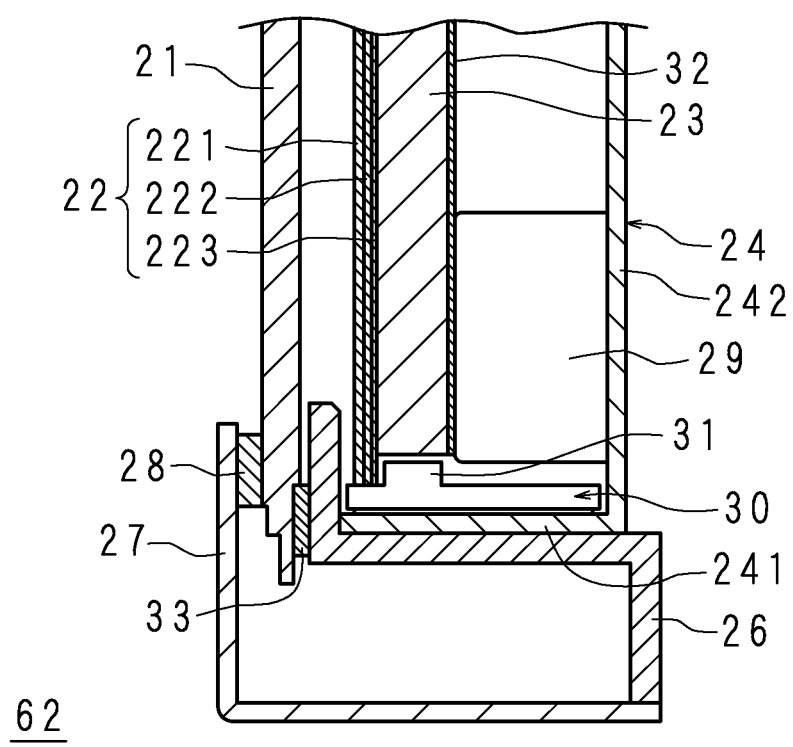
FIG. 11 is a partial vertical section view of a display module in a portion of an optical sheet group where no protrusion is formed according to Embodiment 4 of the present invention.
Figure 12:
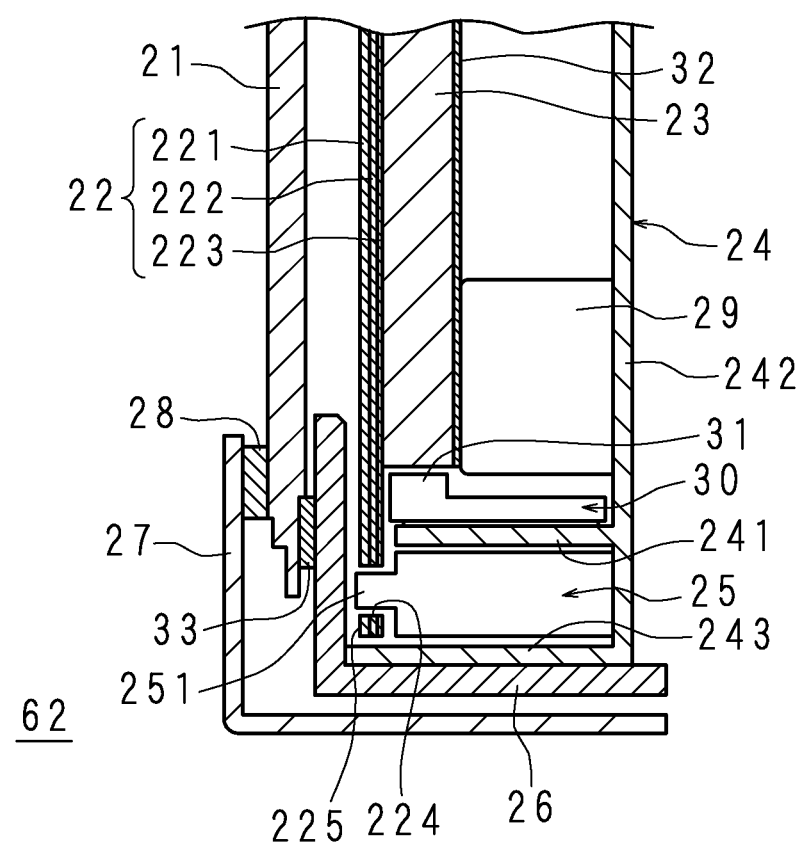
FIG. 12 is a partial vertical section view of a display module in a portion of the optical sheet group where a protrusion is formed.

FIG. 11 is a partial vertical section view of a display module 62 in a portion of an optical sheet group 22 where a protrusion 225 is not formed; and FIG. 12 is a partial vertical section view of a display module 62 in a portion of the optical sheet group 22 where a protrusion 225 is formed. In FIGS. 11 and 12, the same parts as those in FIGS. 7, 8, 9 and 10 will be denoted by the same reference codes and will not be described in detail.

At the middle part on the lower side of the optical sheet group 22, a protrusion 225 formed in a small angled plate shape is provided downward, and a latch hole 224 having the shape of a round hole is formed at the protrusion 225.

At the lower side in the middle of the side part 241 of the chassis 24, a protrusion covering part 243 having a rectangular shape in a front view is formed, and a projecting part 25 is formed on the back surface side of the protrusion covering part 243.

The lower side part of the panel holding member 26 is formed to cover a portion not provided with the protrusion covering part 243 of the side part 241 while covering the bottom of the protrusion covering part 243 at the portion provided with the protrusion covering part 243.

As illustrated in FIG. 11, the lower side portion of the optical sheet group 22 not provided with the protrusion 225 is supported by the flat surface of the LED substrate 30.

As illustrated in FIG. 12, the protrusion 225 is accommodated in the protrusion covering part 243 in the state where the latch projection 251 is inserted into the latch hole 224 and the lower end of the protrusion 225 is separated from the bottom surface of the protrusion covering part 243 by a small distance.

In the present embodiment, the protrusion 225 is fitted into the protrusion covering part 243, which further suppresses the movement of the optical sheet group 22 in the X-direction and Y-direction.

Embodiment 5

The display module 72 according to Embodiment 4 of the present invention has a configuration similar to that of the display module 2 according to Embodiment 1, except that the optical sheet group 22 is configured to be supported by the panel holding member 26.

Figure 13:
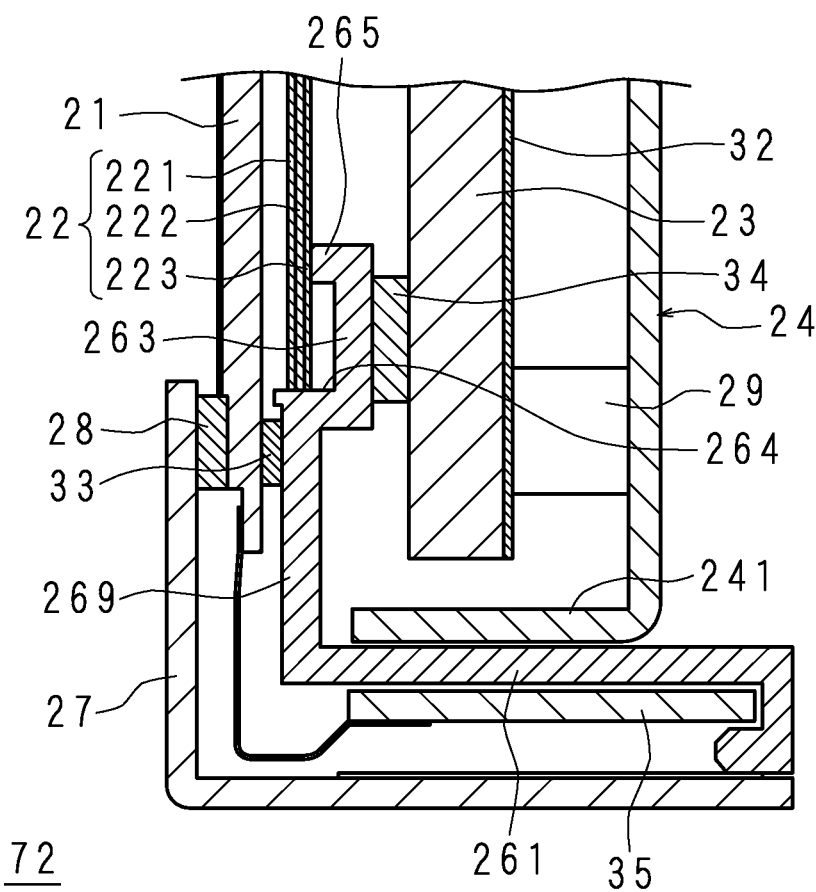
FIG. 13 is a partial vertical section view illustrating a display module according to Embodiment 5 of the present invention.
Figure 14:
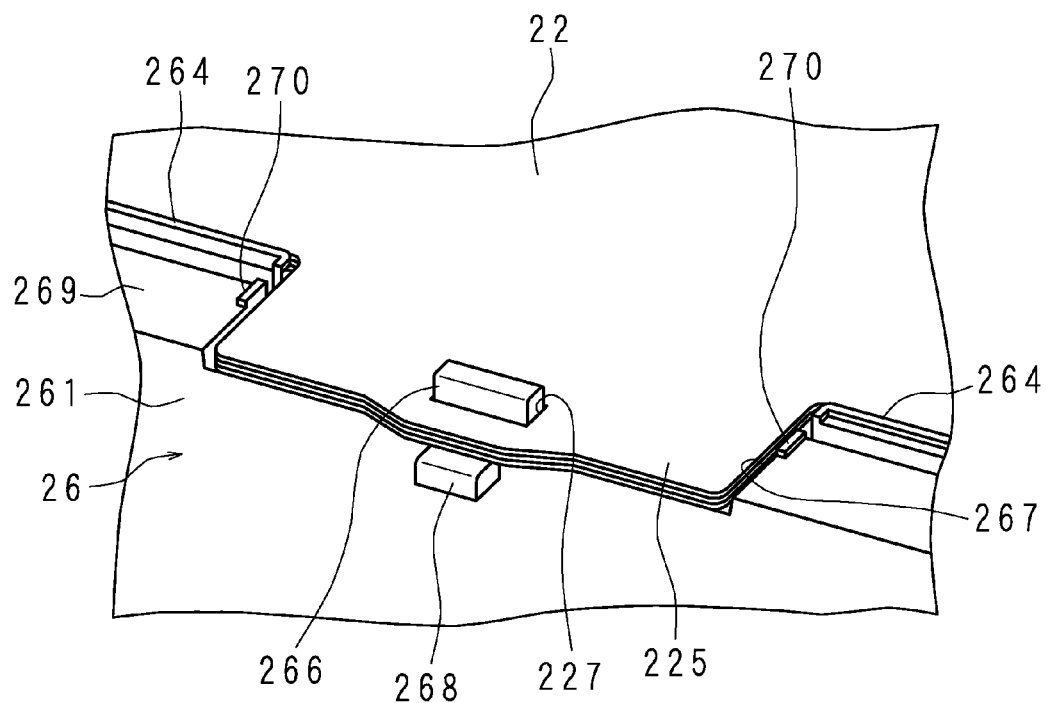
FIG. 14 is a perspective view illustrating a state where the protrusion in the optical sheet group according to Embodiment 5 of the present invention is fitted into a concave part of a panel holding member.
Figure 15:
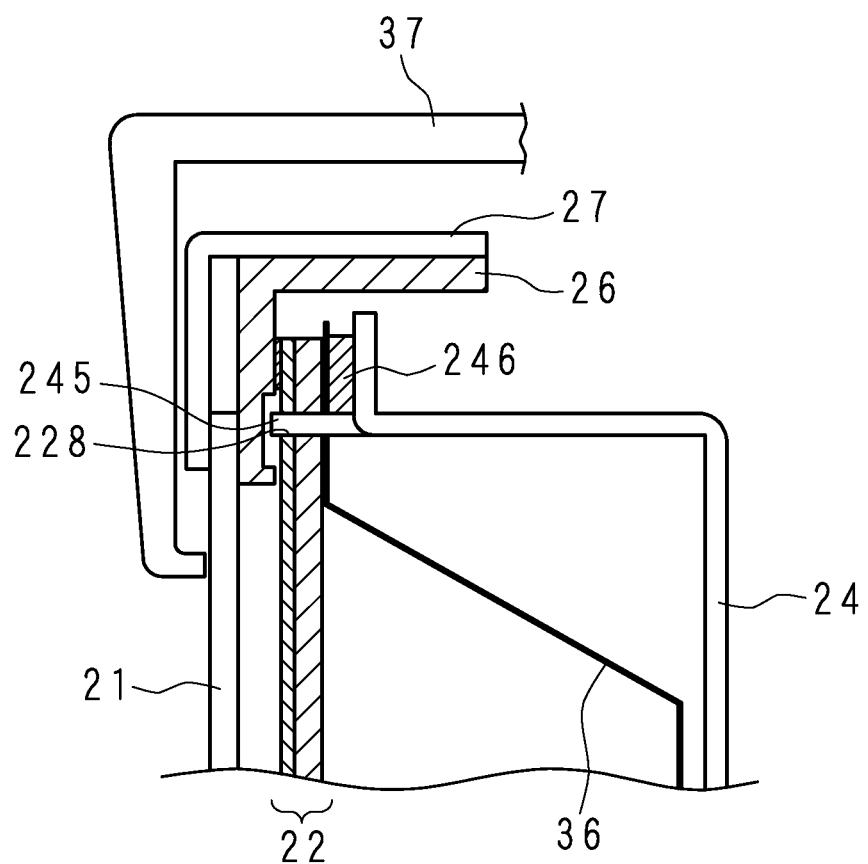
FIG. 15 is a partial vertical section view illustrating the display apparatus according to Japanese Patent Application Laid-Open Publication No. 2007-24913.

FIG. 13 is a partial vertical section view illustrating a display module 72 according to Embodiment 5 of the present invention; and FIG. 14 is a perspective view illustrating a state where the protrusion 225 in the optical sheet group 22 is fitted into a concave part 267 of a panel holding member 26.

At the middle part on the lower side of the optical sheet group 22 formed in the shape of a rectangular plate, a protrusion 225 having a small angled plate shape is formed downward, and a latch hole 227 which is an angled hole having a horizontally long rectangular shape is provided at the middle part of the protrusion 225.

The panel holding member 26 includes a chassis covering part 261, a panel contact part 269, a sheet support 263, a latch projection 266 and a concave part 267.

The chassis covering part 261 extends in the horizontal direction and makes contact with the side part 241 of the chassis 24. A source substrate 35 is placed on the lower surface of the chassis covering part 261.

A panel contact part 269 is formed vertically to the chassis covering part 261, having a buffer member 33 and being in contact with the lower part of the back surface of the display panel 21. The sheet support 263 is continuously formed at the upper side of the panel contact part 269, having a lateral U-shape in a side view, and supporting a portion of the lower side of the optical sheet group 22 where a protrusion 225 is not formed. In other words, it is so configured that the lower side of the optical sheet group 22 is supported by a lower plate 264 of the sheet support 263, and a tip end of the upper plate 265 of the sheet support 263 is in contact with the lower side of the back surface of the optical sheet group 22. The back surface of the sheet support 263 is in contact with the front surface of the light guide plate 23 through the buffer member 34.

The concave part 267 has a horizontally-long rectangular shape, and is formed in a middle part in the horizontal direction of the panel contact part 269. The lateral width of the concave part 267 is a little longer than the lateral width of the protrusion 225. The latch projection 266 having a horizontally long rectangular shape is formed at the middle of the concave part 267, the lateral width of the latch projection 266 being a little shorter than the lateral width of the latch hole 227.

The protrusion 225 is fitted into the concave part 267 in the state where the latch projection 266 is inserted into the latch hole 227.

Projecting parts 270, 270 are formed at the edges on both sides of the concave part 267 at the panel contact part 269, and a projecting part 268 is formed at a portion of the chassis covering part 261 corresponding to the latch projection 266.

The movement of the protrusion 225 in the Y-direction is inhibited by the projecting part 268, while the movement of the protrusion 225 in the X direction is inhibited by the projecting parts 270, 270.

Though not illustrated in FIG. 14, a buffer member 33 has a substantially rectangular frame-like shape and is divided at the portion corresponding to the concave part 267. In other words, the buffer member 33 is not interposed in the portion corresponding to the concave part 267.

In the present embodiment, in the state where the protrusion 225 is fitted while the latch projection 266 is inserted into the latch hole 227 to position the optical sheet group 22 in the X direction, the lower part of the optical sheet group 22 is supported by the sheet support 263 (lower plate 264), thereby suppressing the occurrence of a deflection and slit in the optical sheet group 22 and further suppressing the occurrence of a flaw in the light guide plate 23, polarization plate and the like caused by the optical sheet group 22 moving in the front-back directions.

Moreover, the support structure for the optical sheet group 22 according to the present embodiment can be made compact, achieving a higher degree of design freedom compared to the case where the projecting part 25 is formed at the bottom part 242 of the chassis 24. Furthermore, as the protrusion 225 is disposed at the portion where the buffer member 33 is normally placed, narrowing the frame of the display module 72 is not hindered.

As a modification of the present embodiment, the optical sheet group 22 may also be supported by the lower plate 264 in the state where the protrusion 225 is not formed at the optical sheet group 22, a latch projection is formed on the front surface of the sheet support 263 instead of the latch projection 266 formed at the panel contact part 269, and the latch projection is inserted into a latch hole 227 formed at the middle part on the lower side of the optical sheet group 22 to position the optical sheet group 22.

Embodiments 1 through 5 disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

For example, though each of Embodiments 1 to 5 described the case where the display module 2 has an edge light system only on one side thereof, the display module 2 is not limited thereto and may also have the edge light system on both sides.

Moreover, the display module is not limited to the case of an edge light type, but may also be a direct type.

Furthermore, the display apparatus is not limited to a display apparatus for a TV receiver.

What is claimed is:
1. A display apparatus, comprising:
a chassis in which a light source and a light guide plate or a diffusion plate are accommodated;
an optical sheet disposed in parallel with a bottom part of the chassis;
a display panel disposed outside the optical sheet; and
a panel holding member holding the display panel while sandwiching the optical sheet between the panel holding member and the light guide plate or diffusion plate,
further comprising:
a latch hole formed at a lower side portion of the optical sheet; and
a projecting part formed at a portion of a bottom part of the chassis, the portion being opposed to the latch hole, and latched by being inserted into the latch hole,
wherein the lower side portion of the optical sheet is supported by a side part on a lower side of the chassis.

2. A display apparatus, comprising:
a chassis in which a light source and a light guide plate or diffusion plate are accommodated;
an optical sheet disposed in parallel with a bottom part of the chassis;
a display panel disposed outside the optical sheet; and
a frame-like panel holding member holding the display panel while sandwiching the optical sheet between the panel holding member and the display panel, further comprising:
a latch hole formed at a lower side portion of the optical sheet;
a projecting part formed at a portion of the panel holding member, the portion being opposed to the latch hole, and latched by being inserted into the latch hole; and
a sheet support provided to protrude outward at a portion of the panel holding member, the portion being opposed to the optical sheet, for supporting a lower side of the optical sheet.

3. A display apparatus, comprising:
a chassis in which a light guide plate is accommodated;
an optical sheet disposed in parallel with a bottom part of the chassis;
a substrate having a light emitting element and disposed on a side surface of the light guide plate;
a display panel disposed outside the optical sheet; and
a panel holding member holding the display panel while sandwiching the optical sheet between the panel holding member and the light guide plate, further comprising:
a latch hole formed at a lower side portion of the optical sheet; and
a projecting part formed at a portion of the light guide plate or the chassis, the portion being opposed to the latch hole, and latched by being inserted into the latch hole,
wherein the lower side portion of the optical sheet is supported by the substrate.

4. The display apparatus according to claim 1, wherein
a protrusion protruding downward from the lower side portion is formed at the optical sheet, and
the latch hole is formed at the protrusion.

5. The display apparatus according to claim 2, wherein
a protrusion protruding downward from the lower side portion is formed at the optical sheet, and
the latch hole is formed at the protrusion.

6. The display apparatus according to claim 3, wherein
a protrusion protruding downward from the lower side portion is formed at the optical sheet, and
the latch hole is formed at the protrusion.

7. The display apparatus according to claim 1, comprising a plurality of the latch holes and the projecting parts.

8. The display apparatus according to claim 2, comprising a plurality of the latch holes and the projecting parts.

9. The display apparatus according to claim 3, comprising a plurality of the latch holes and the projecting parts.

10. The display apparatus according to claim 1, wherein a regulation part for regulating movement in a horizontal direction of the optical sheet is provided at an upper part of the optical sheet.

11. The display apparatus according to claim 2, wherein a regulation part for regulating movement in a horizontal direction of the optical sheet is provided at an upper part of the optical sheet.

12. The display apparatus according to claim 3, wherein a regulation part for regulating movement in a horizontal direction of the optical sheet is provided at an upper part of the optical sheet.

13. The display apparatus according to claim 1, wherein the optical sheet includes a reflective polarization sheet.

14. The display apparatus according to claim 2, wherein the optical sheet includes a reflective polarization sheet.

15. The display apparatus according to claim 3, wherein the optical sheet includes a reflective polarization sheet.

* * * * *